(12) United States Patent
Kim et al.

(10) Patent No.: US 6,552,996 B2
(45) Date of Patent: Apr. 22, 2003

(54) OVSF CODE SYSTEM AND METHODS

(75) Inventors: Younglok Kim, Fort Lee, NJ (US); Jung-Lin Pan, Selden, NY (US)

(73) Assignee: InterDigital Communications Corporation, Wilmington, DE (US)

( * ) Notice: Subject to any disclaimer, the term of this patent is extended or adjusted under 35 U.S.C. 154(b) by 0 days.

(21) Appl. No.: 10/040,513

(22) Filed: Dec. 28, 2001

(65) Prior Publication Data

US 2003/0058788 A1 Mar. 27, 2003

Related U.S. Application Data

(60) Provisional application No. 60/323,120, filed on Sep. 18, 2001.

(51) Int. Cl.$^7$ ................................................ H04J 13/00
(52) U.S. Cl. ....................................... 370/209; 370/208
(58) Field of Search ................................ 370/208, 209, 370/320, 335, 342, 441

(56) References Cited

U.S. PATENT DOCUMENTS

| | | | |
|---|---|---|---|
| 5,751,761 A | | 5/1998 | Gilhousen |
| 6,009,091 A | | 12/1999 | Stewart et al. |
| 6,091,757 A | * | 7/2000 | Cudak et al. ............... 375/130 |
| 6,163,524 A | * | 12/2000 | Magnusson et al. ......... 370/208 |
| 6,222,875 B1 | * | 4/2001 | Dahlman .................... 375/200 |
| 6,233,231 B1 | * | 5/2001 | Felix et al. ................. 370/335 |
| 6,400,755 B1 | * | 6/2002 | Harris et al. ............... 375/146 |

OTHER PUBLICATIONS

F. Adachi et al., "Tree Structured Generation of Orthogonal Spreading Codes With Different Length for Forward Link of DS–CMDA Mobile Radio", Electronics Letters, vol. 33, No. 1, Jan. 1997.
E.H. Dinan et al., "Spreading Codes for Direct Sequence CDMA and Wideband CDMA Cellular Networks", IEEE Communication Magazine, Sep. 1998.
P. Godlewski et al., "Orthogonal Variable Rate Spreading Sequences With Improved Correlation Properties for Wireless CDMA Cellular Networks", Vehicular Technology Conference, May 1999.
R.G. Cheng et al. "OVSF Code Channel Assignment for IMT–2000", Vehicular Technology Coference, Spring 2000.
T. Minn et al., "Dynamic Assignment of Orthogonal Variable Spreading Factor Codes in W–CDMA", IEEE Journal on Selected Areas in Communication, vol. 18, No. 8, Aug. 2000.

* cited by examiner

*Primary Examiner*—Ken Vanderpuye
(74) *Attorney, Agent, or Firm*—Volpe and Koenig, P.C.

(57) ABSTRACT

A code indexing method for orthogonal variable spreading factor (OVSF) codes introduces a single number mapped to the each code. The new code number itself not only provides the code signature, but it is also used for the OVSF code generation. In addition, it provides easy and fast generation of the available code list without the help of look-up table. This capability improves the dynamic code assignment.

15 Claims, 2 Drawing Sheets

| Layer Number | SF/Code number | New code label in binary (a0,a1,...) | New code label in decimal | OVSF code word (-1 is substituted with 0) |
|---|---|---|---|---|
| 0 | 1/0 | 1 | 1 | 1 |
| 1 | 2/0 | 10 | 2 | 11 |
| 1 | 2/1 | 11 | 3 | 10 |
| 2 | 4/0 | 100 | 4 | 1111 |
| 2 | 4/1 | 101 | 5 | 1100 |
| 2 | 4/2 | 110 | 6 | 1010 |
| 2 | 4/3 | 111 | 7 | 1001 |
| 3 | 8/0 | 1000 | 8 | 11111111 |
| 3 | 8/1 | 1001 | 9 | 11110000 |
| 3 | 8/2 | 1010 | 10 | 11001100 |
| 3 | 8/3 | 1011 | 11 | 11000011 |
| 3 | 8/4 | 1100 | 12 | 10101010 |
| 3 | 8/5 | 1101 | 13 | 10100101 |
| 3 | 8/6 | 1110 | 14 | 10011001 |
| 3 | 8/7 | 1111 | 15 | 10010110 |

FIGURE 2

OVSF CODE SYSTEM AND METHODS

CROSS-REFERENCE TO RELATED APPLICATION

This application claims priority from U.S. Provisional Patent Application Ser. No. 60/323,120, filed Sep. 18, 2001.

FIELD OF INVENTION

The present invention relates CDMA communication systems and, in particular, to Orthogonal Variable Spreading Factor (OVSF) codes and methods for allocating, generating and determining orthogonality of OVSF codes of different data rates.

BACKGROUND

Orthogonal variable spreading factor (OVSF) codes provide an orthogonal code set of variable spreading factors. In the prior art, methods exist for allocating a set of OVSF codes of different data rates employing Walsh codes of variable length. The code assignment is made on the basis of channel data rates in a manner that results in improved utilization of the available frequency spectrum.

An alternative method to obtain OVSF codes based on the code tree structure is based on the modified Hadamard transformation, which requires two indices to indicate a specific code, (i.e., spreading factor and code number). In order to handle the code allocation process, an ASSIGNED list and a BUSY conventionally generated.

These prior art methods have drawbacks in that they require a large amount of memory to store a large number of codes, or require fast processing speeds to generate the codes or effectively allocate the available codes.

SUMMARY

A code indexing system and method for orthogonal variable spreading factor (OVSF) codes introduces a single number mapped to the each code. The new code number itself not only provides the code signature, but it is also used for the OVSF code generation. In addition, it provides easy and fast generation of the available code list without the help of look-up table. This capability improves the dynamic code assignment.

OVSF codes are selected from a set of Walsh codes by using an index p where p represents the $(p+1)-2^i$ th Walsh code of the ith layer of Walsh codes where i is an integer such that $2^i \leq p < 2^{i+1}$. Preferably, the OVSF code is selected on the basis of a spreading factor SF which is a power of 2 and a Walsh code is selected having an associated index p where $SF \leq p < 2SF$.

The relative orthogonality of a selected Walsh code of layer i represented by index value p with another Walsh code of layer j represented by an index value q is determined by comparing the binary forms of p and q. The binary form of p is a sequence of i significant binary digits and the binary form of q is a sequence of j significant binary digits. The represented Walsh codes are determined to be not orthogonal if either the binary form of p is the same as the i most significant binary digits of the binary form of q or the binary form of q is the same as the j most significant binary digits of the binary form of p.

A selected Walsh code represented by index value p is easily generated based upon the sequence of significant binary digits representing the binary form of p. The selected Walsh code is generated as the Kronecker Product of i Walsh codes represented by index values 2 and 3 correspondingly to the sequence of i significant binary digits of the binary form of p where each binary digit 0 corresponds to the Walsh code of index value 2 and each binary digit 1 corresponds to the Walsh code of index value 3.

Alternatively, the selected Walsh code is generated by the Kronecker product of two Walsh codes represented by index values q and r of respective layers of j and k where $j+k=i$. In such case, the binary form of p is the same as the binary form of q concatenated with the binary forms of $(r-2^k)$.

In general, OVSF codes are used and selected based upon a spreading factor SF where SF is a positive power of 2, using an index p from a set of codes where for each integer $p>3$ the corresponding code is defined by $C(p)=C(m+2) \oplus C(k)$, with $p=2 \cdot k+m$, where k and m are integers with $m=0$ or 1. The codes corresponding to $p=1$, 2 or 3 are $C(1)=[1]$, $C(2)=[1,1]$, and $C(3)=[1,-1]$. Accordingly, p represents the $(p+1)-2^i$ th code of an ith layer of codes for $SF=2^i$ where i is the unique integer such that $2^i \leq p < 2^{i+1}$.

Other objects and advantages of the invention will be apparent to those skilled in the art from the following description.

BRIEF DESCRIPTION OF THE DRAWING(S)

FIG. 2 is a table representing an indexing system according to the teaching of the present invention.

DETAILED DESCRIPTION OF THE PREFERRED EMBODIMENT(S)

Figure 1:
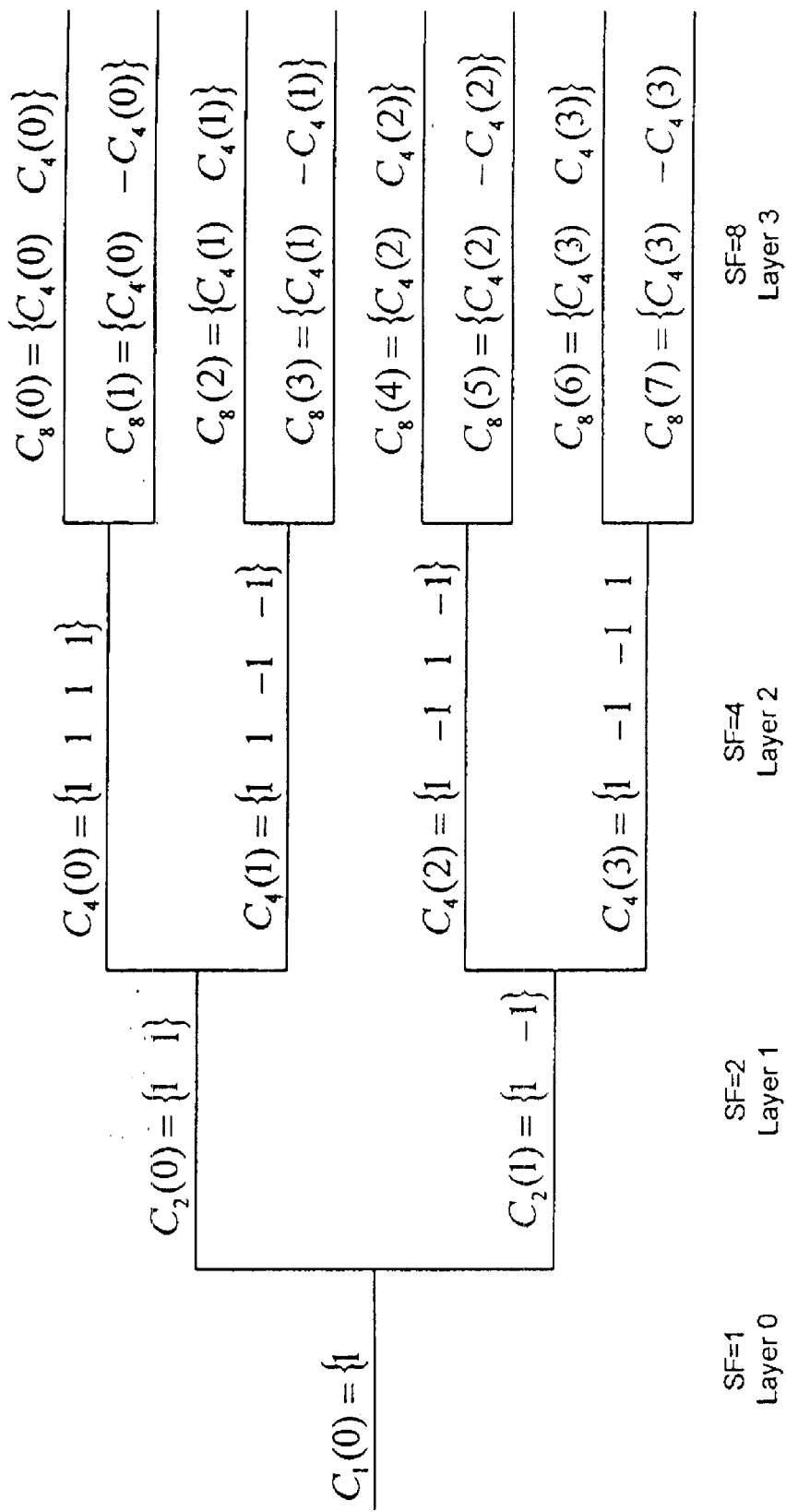
FIG. 1 is a prior art OVSF code tree of Walsh codes.

A conventional OVSF code tree structure is shown in FIG. 1 which codes are referred to as Walsh codes herein. $C_{SF}(n)$ denotes the OVSF code word with the spreading factor $SF=2^k$, where n is the code number and k is the layer number. The indices n and k are known as the Hadamard indices. The Walsh codes are conventionally generated recursively from the code tree as shown in FIG. 1.

The mother codes are the lower layer codes on the path from the specific code to the root code $C_1(0)$, and the descendent codes are those produced from the specific code. For example, the mother codes of $C_8(2)$ is $C_4(1)$, $C_2(0)$ and $C_1(0)$, and the descendent codes of $C_4(1)$ are $C_8(2)$, $C_8(3)$ and their descendent codes.

Two codes are orthogonal if, and only if, any one is not the mother code or the descendent code of another. When a specific code is assigned, its mother codes and descendent codes cannot be assigned in the same channel since they are not orthogonal to each other. In other words, two OVSF codes with different spreading factors are not orthogonal when they are on the same branch of the code tree.

When a new call is requested with a specific data rate, the system needs to assign a code from an available set of codes with the corresponding spreading factor. Conventionally, in order to maintain the orthogonality between assigned codes, the set of available code list is updated whenever the new code is assigned. This code set is updated by removing the assigned code itself and all of its descendent and mother codes.

The inventors have recognized that the prior art codes can each be assigned via a single indice system instead of the dual indice system per the known Hadamard method. In the single indice system of the present invention, a sequential numerical code label p is assigned where p equals the sum of the code layer plus the code number of the conventional tree structure designation using Hadamard indices. As such, the code labels are sequential integers starting with the one code of layer 0 where SF=1 labeled as 1, the two codes of layer 1 where SF=2 labeled as 2 and 3, followed by the $2^i$ codes of layer i where SF=$2^i$ labeled as the next $2^i$ integers for each successive layer i from 2 onward as represented in FIG. 2 for layers 0 through 3. Although only codes for spreading factors up to 8 are shown in FIG. 2, the system is applicable for spreading codes of any power of 2.

In general for each positive integer label p, there is a unique integer i, where $2^i \leq p < 2^{(i+1)}$, and p represents the $(p+1)-2^i$ th Walsh code of the ith layer of Walsh codes. For example, when p=87, i=6 since $64 \leq p < 128$, so that 87 represents the 24th Walsh code of the 6th layer of the Walsh codes. For p=1, i=0 since $2^0 \leq 1 < 2$, so 1 represents the first code of the zeroth layer. Generally, for a prior art code designated $C_N(x)$, that code is the (x+1) th code of layer N, since the prior art code designations start for each layer with x=0.

In stead of using the prior art designations of FIG. 1, the prior art tree-structured codes can be generated for each positive integer p by the recursive Kronecker procedure where for each integer p>3 the corresponding code is defined by:

$$C(p)=C(m+2) \oplus C(k), \qquad \text{Equation (1)}$$

with $$p = 2 \cdot k + m, \qquad \text{Equation (2)}$$

where k and m are integers with m=0 or 1, and the codes corresponding to p =1,2 or 3 are:

$$C(1)=[1], C(2)=[1,1], \text{ and } C(3)=[1,-1]. \qquad \text{Equation (3)}$$

As noted above, for any specified p there is a unique integer i such that $2^i \leq p < 2^{i+1}$, so that each p represents a code of only one SF, namely SF=$2^i$. Also, the code represented by p is the $(p+1)-2^i$ th code of an ith layer of codes starting with p=1 representing the first code of a zeroth layer.

Codes generated in this manner meet the following three properties:

Property 1: The OVSF code for code label p where SF$\leq$p<2 SF and SF=$2^L$ can be factored into a Kronecker product with L terms of C(2) or C(3) as follows:

$$C(p)=C(a_{L-1}+2) \oplus \ldots \oplus C(a_1+2) \oplus C(a_0+2) \qquad \text{Equation (4)}$$

where $a_0$=1 and each $a_i$, for i=1 to L-1, is 0 or 1 and $$p = a_0 \cdot 2^{L-1} + a_1 \cdot 2^{L-2} + \ldots + a_{L-1} = \sum_{i=0}^{L-1}(a_i \cdot 2^{(L-i-1)}) \qquad \text{Equation (5)}$$

Thus, $a_0 a_1 \ldots a_{L-1}$ is the binary representation of p where $a_0$=1 and each $a_i$, for i>1, is the binary digit 1 or 0.

Property 2: The mother, codes of C(p) are all of the form:

$$[C(a_{L-m}+2) \oplus \ldots \oplus C(a_1+2) \oplus C(a_0+2)] \text{ with } m=2,3, \ldots L.$$

Property 3: The descendent codes of C(p) are all C(q)$\oplus$C(p) with any positive integer q.

For notational purposes, code designations of the present invention C(p) where p is in decimal form can also be represented as c($P_{binary}$), i.e. c($a_0 \ldots a_{N-1}$) where $a_0 \ldots a_{N-1}$ is the binary representation of p. For example, C(6)=c(110), since 6 in decimal notation equals 110 in binary notation.

The code indexing system in accordance with the present invention is illustrated in FIG. 2. The OVSF codewords with their spreading factor up to 8 are shown with both the conventional index using the Hadamard indices and the new code index representations.

The OVSF code layer numbers are shown in the first column. The conventional OVSF code indices are shown in the second column, i.e., SF and code number. The third and fourth columns are the binary and decimal forms of the code labels of the present invention. The code label index maps a code label to each codeword shown in the last column. The codewords of FIG. 2 correspond directly to the Walsh code sets of 1s and −1s in FIG. 1 with 0s in the codeword being substituted for each −1 of the corresponding Walsh code.

In view of properties 2 and 3, the mother codes and descendent codes of c(a0,a1,a2,a3) are {c(a0), c(a0,a1), c(a0,a1,a2)} and all the codes having binary indices starting with (a0,a1,a2,a3), i.e., c(a0, a1,a2,a3, X, X, X, . . . ) are easily identifiable.

The code label indexing method in accordance with the present invention has several distinct advantages over prior art methods:

1) Reduced number of Bits for Identifying Codes and Increased Capacity

The new indexing method needs only L+1 bits to support the maximum spreading factor $2^L$, while the conventional indexing needs L+$\lceil \log_2(L)-1 \rceil$ bits for the same case. For example, there is a 3 bit saving for the maximum spreading factor 512. For maximum spreading factor 512, the conventional method needs 4 bits to store ten spreading factors {1,2,4,8,16,32,64,128,256,512} or ten layer numbers {0,1, 2,3,4,5,6,7,8,9} correspondingly. In addition, the conventional method needs 9 bits to distinguish between the 512 codes in the 10th layer. Accordingly, a total of 13 bits are conventionally required to identify a particular code within a 10 layer system which supports spreading factors up to and including 512. In comparison, the new method needs only 10 bits to distinguish all the codes of 1023 for spreading factors up to and including 512. The reduction of 3 bits from 13 bits represents a nearly 25% increase in capacity.

2) Easy to Generate Available Orthogonal Codes During Code Assignment

With the new indexing, the available code with the specific spreading factor can be generated directly in a straightforward way from the binary form of the indices of the assigned code without requiring the use of look-up tables.

For instance, if the code represented by 89 (or 1011001) is assigned, its mother codes and descendent codes cannot be assigned for the use simultaneously to maintain relative orthogonality of used codes. Those codes would normally be marked "BUSY" when code 89 is used. The BUSY codes are easily generated because mother codes of code#89 are code#70 (101100), code#22 (10110), code#11 (1011), code#5 (101), code#2(10), code#(1), and its descendent codes, in a nine layer system, are code#178 (10110010), code#179 (10110011), code#356 (101100100), code#357 (101100101), code#358 (101100110), code#359 (101100111) according to properties 2 and 3.

In general, each code index has a binary form which is represented by a sequence of significant binary digits of a length equal to the layer of the Walsh code it represents. To determine the relative orthogonality of one Walsh code of layer i, represented by index value p, with another Walsh code of layer j, represented by an index value q, the binary forms of p and q are compared. Since the binary form of p is a sequence of i significant binary digits and the binary form of q is a sequence of j significant binary digits, the represented Walsh codes are not orthogonal only if either the binary form of p is the same as the i most significant binary digits of the binary form of q or the binary form of q is the same as the j most significant binary digits of the binary form of p. For p=87, this condition is true only for q=1, 2, 5, 11, 22, 70, 178, 178, 356, 357, 358 or 359 in a nine layer system as referenced above.

3) Easy to Spread with the Long Code

The spread sequence with a long code can be obtained by the multiple spreading with shorter spreading factors. The short spreading code numbers are directly extracted from the long code number.

For example, the spreading code $c(a_0, a_1, \ldots, a_M)$ is the Kronecker product of $c(a_0, a_1, \ldots, a_N)$ and $c(a_0, a_{N+1}, a_{N+2}, \ldots, a_M)$ with $N \leq M$. Hence, the long spreading can be obtained by two consecutive spreadings first with $c(a_0, a_{N+1}, a_{N+2}, \ldots, a_M)$ and then with $c(a_0, a_1, \ldots, a_N)$.

4) Easy to Generate the Long Code

The long code $c(a_0, a_1, \ldots, a_M)$ can be obtained by spreading $c(a0, a_1, \ldots a_N)$ with $c(a_0, a_{N+1}, a_{N+2}, \ldots, a_M)$. There is no additional hardware complexity in generating the long code from the shorter code.

For example, with references to FIG. 2:

$$c(1110) = c(11) \oplus c(110) \qquad \text{Equation (6)}$$

since, $$[1,-1,-1,1,1,-1,-1,1] = [1,-1] \oplus [1,-1,1,-] \qquad \text{Equation (7)}$$

Also:

$$c(1110) = c(111) \oplus c(10) \qquad \text{Equation (8)}$$

since, $$[1,-1,-1,1,1,-1,-1,1] = [1,-1,-1,1,1] \oplus [1,1] \qquad \text{Equation (9)}$$

In general, any Walsh code of layer i, represented by an index value p, can be generated by the Kronecker product of two Walsh codes of layers j and k represented by respective index values of q and r where j+k=i. In such case the binary form of p is equal to the binary form of q concatenated with the binary form of $(r-2^k)$.

Reduced Memory Size for Code Table

The whole spreading code set does not have to be tabulated in the memory. The above multi-stage spreading scheme needs a much smaller table supporting a lower spreading factor. In addition, there is no need to store the look-up table for the mother codes and descendent codes of all codes. They can be generated in a straightforward manner. For example, a 256 length OVSF code of layer 8 can be generated by two 16 length OVSF codes of layer 4. Hence a code table supporting codes up through layer 4 for a 16 SF is enough to support the easy generation of all codes through layer 8 for a 256 SF. Alternatively, all spreading codes can be generated using the layer two codes c(10) and c(11) per equation 4 above where c(10)=C(2)=[1,1] and c(11)=C(3)=[1,-1].

6) Enable Easy and Fast Dynamic Channel Assignment (DCA)

The indexing of the present invention benefits the dynamic code assignment for easy and fast generation of AVAILABLE and BUSY code lists. In conventional indexing methods, look-up tables are required to store and search through all the mother codes and descendent codes of all codes. Conventionally, the look-up tables take up large amounts of memory and the searching process is time-consuming.

With the new indexing method, there is no need for look-up tables. All the mother codes and descendent codes can be obtained directly in a straightforward manner from the assigned codes. This enables a easy and fast dynamic code assignment.

Moreover, only a list of the index values of used codes need be maintained to determine whether an orthogonal code is available and to select such an orthogonal code. Where a code of spreading factor SF is needed and prior used codes indexes $p_1 \ldots p_n$ have been stored to a used code list, each value p from SF through 2SF−1 can be compared against the stored used code index values to determine the availability of an orthogonal code.

For simplicity, p can be first set equal to SF and the binary form of p can be compared to the binary form of each of the stored used code index values to determine orthogonality as set forth above. If a comparison yields a determination of non-orthogonality, the comparison process can be stopped, p incremented by 1 and the comparison process repeated with the incremented p. The process continues until a p is found which represents a code orthogonal to all the used codes or until p is incremented to equal 2SF. In the first case, the code corresponding to p is selected for use as an orthogonal code and p is stored to the set of used codes. In the second case where p is incremented to equal 2SF, no orthogonal code is available.

The new code index method is a method for assigning single number that indicates the layer number and the code number, and moreover it indicates the structure of the code and the information about the orthogonality to other codes.

What is claimed is:

1. In a communications system where OVSF codes are selected from a set of Walsh codes represented as a binary tree having multiple layers such that a zeroth layer has one Walsh code and each successive layer has twice the number of Walsh codes as the layer it succeeds, the method comprising:

selecting an OVSF code from the set of Walsh codes using an index p where p represents the $(p+1)-2^i$ th Walsh code of the ith layer of Walsh codes where i is an integer such that $2^i \leq p < 2^{i+1}$.

2. The method according to claim 1 wherein the OSVF code is selected on the basis of a spreading factor SF which is a power of 2 and a Walsh code is selected having an associated index p where $SF \leq p < 2SF$.

3. The method of claim 1 further comprising determining the relative orthogonality of the selected Walsh code of layer i represented by index value p with another Walsh code of layer j represented by an index value q by comparing the binary forms of p and q.

4. The method of claim 3 wherein the binary form of p is a sequence of i significant binary digits and the binary form of q is a sequence of j significant binary digits and the represented Walsh codes are determined to be not orthogonal if either the binary form of p is the same as the i most significant binary digits of the binary form of q or the binary form of q is the same as the j most significant binary digits of the binary form of p.

5. The method of claim 1 further comprising generating a selected Walsh code represented by index value p based upon a sequence of significant binary digits representing the binary form of p.

6. The method of claim 5 wherein the selected Walsh code is generated as the Kronecker Product of i Walsh codes represented by index values 2 and 3 correspondingly to the sequence of i significant binary digits of the binary form of p where each binary digit 0 corresponds to the Walsh code of index value 2 and each binary digit 1 corresponds to the Walsh code of index value 3.

7. The method of claim 5 wherein the selected Walsh code is generated by the Kronecker product of 2 Walsh codes represented by index values q and r of respective layers of j and k where j+k=i.

8. The method of claim 7 wherein the binary form of p is the same as the binary form of q concatenated with the binary forms of $(r-2^k)$.

9. In a communications system where OVSF codes are used and selected based upon a spreading factor SF where SF is a positive power of 2, the method comprising:

selecting an OVSF code using an index p from a set of codes where:

for each integer p>3 the corresponding code is defined by $C(p)=C(m+2)\oplus C(k)$, with $p=2\cdot k+m$, where k and m are integers with m=0 or 1, and the codes corresponding to p=1, 2, or 3 are C(1)=[1], C(2)=[1,1], and c(3)=[1, −1]

whereby each p represents the $(p+1)-2^i$ th code of an ith layer of codes for $SF=2^i$ where i is the unique integer such that $2^i \leq p < 2^{i+1}$.

10. The method according to claim 9 further comprising determining the relative orthogonality of a selected code of layer i represented by index value p with another code of layer j represented by an index value q by comparing the binary forms of p and q.

11. The method of claim 10 wherein the binary form of p is a sequence of i significant binary digits and the binary form of q is a sequence of j significant binary digits and the represented codes are determined to be not orthogonal if either the binary form of p is the same as the i most significant binary digits of the binary form of q or the binary form of q is the same as the j most significant binary digits of the binary form of p.

12. The method of claim 9 further comprising generating a selected code represented by index value p based upon a sequence of significant binary digits representing the binary form of p.

13. The method of claim 12 wherein the selected code is generated as the Kronecker Product of i codes represented by index values 2 and 3 correspondingly to the sequence of i significant binary digits of the binary form of p where each binary digit 0 corresponds to the code of index value 2 and each binary digit 1 corresponds to the code of index value 3.

14. The method of claim 12 wherein the selected code is generated by the Kronecker product of two codes represented by index values q and r of respective layers of j and k where j+k=i.

15. The method of claim 14 wherein the binary form of p is the same as the binary form of q concatenated with the binary forms of $(r-2^k)$.

* * * * *

UNITED STATES PATENT AND TRADEMARK OFFICE
CERTIFICATE OF CORRECTION

PATENT NO. : 6,552,996 B2  Page 1 of 1
DATED : April 22, 2003
INVENTOR(S) : Kim et al.

It is certified that error appears in the above-identified patent and that said Letters Patent is hereby corrected as shown below:

<u>Title page,</u>
Item [73], Assignee, delete "InterDigital Communications Corporation", and insert therefor -- InterDigital Technology Corporation --.

Signed and Sealed this

Twenty-eighth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,552,996 B2
DATED : April 22, 2003
INVENTOR(S) : Kim et al.

It is certified that error appears in the above-identified patent and that said Letters Patent is hereby corrected as shown below:

Column 2,
Line 14, after "C(m+2)", delete "⊕C(k)" and insert therefor -- ⊗C(k) --.

Column 3,
Line 25, Equation 1, after "C(m+2)", delete "⊕C($k$)" and insert therefor -- ⊗C($k$) --.

Line 45, Equation 4, delete "$C(p) = C(a_{L-1}+2) \oplus \ldots \oplus C(a_1+2) \oplus C(a_0+2)$" and insert therefor -- $C(p) = C(a_{L-1}+2) \otimes \ldots \otimes C(a_1+2) \otimes C(a_0+2)$ --.

Line 57, delete "$[C(a_{L-m}+2) \oplus \ldots \oplus C(a_1+2) \oplus C(a_0+2)]$ with m=2,3,...$L$" and insert therefor -- $[C(a_{L-m}+2) \otimes \cdots \otimes C(a_1+2) \otimes C(a_0+2)]$ with m=2,3,...$L$ --.

Line 59, after "C(q)" delete "⊕ C(p)" and insert therefor -- ⊗ C(p) --.

Column 5,
Line 24, Equation 6, delete "$c(1110)=c(11) \oplus c(110)$" and insert therefor -- $c(1110)=c(11) \otimes c(110)$ --.
Line 27, Equation 7, delete "[1,-1,-1,1,1,-1,-1,1]=[1,-1]⊕[1,-1,1,-]" and insert therefor --[1,-1,-1,1,1,-1,-1,1]=[1,-1]⊗[1,-1,1,1,-] --.
Line 30, Equation 8, delete "$c(1110)=c(111) \oplus c(10)$" and insert therefor -- $c(1110)=c(111) \otimes c(10)$ --.
Line 34, Equation 9, delete "[1,-1,-1,1,1,-1,-1,1]=[1,-1,-1,-1,1] ⊕ [1,1]" and insert therefor -- [1,-1,-1,1,1,-1,-1,1]=[1,-1,-1,-1,1]⊗[1,1] --.

Column 7,
Line 14, after "C(m+2)", delete "⊕C(k)" and insert therefor -- ⊗C(k) --.

Signed and Sealed this

Twentieth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,552,996 B2
DATED : April 22, 2003
INVENTOR(S) : Kim et al.

It is certified that error appears in the above-identified patent and that said Letters Patent is hereby corrected as shown below:

Column 5,
Line 27, Equation 7, delete "$[1,-1,-1,1,1,-1,-1,1]=[1,-1]\otimes[1,-1,1,1-]$" and insert therefor -- $[1,-1,-1,1,1,-1,-1,1]=[1,-1]\otimes[1,-1,1,-1]$ --.

Signed and Sealed this

Sixth Day of July, 2004

JON W. DUDAS
*Acting Director of the United States Patent and Trademark Office*